(12) United States Patent
Rakowicz et al.

(10) Patent No.: US 8,695,200 B2
(45) Date of Patent: Apr. 15, 2014

(54) TETHER FOR TUBES OF AN EXHAUST SYSTEM JOINT

(75) Inventors: Timothy J. Rakowicz, Livonia, MI (US); Kenneth R. Wodzisz, Grosse Pointe, MI (US); Abdullahi M. Hajiabdi, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 13/329,893

(22) Filed: Dec. 19, 2011

(65) Prior Publication Data

US 2013/0154252 A1    Jun. 20, 2013

(51) Int. Cl.
*B23P 11/00* (2006.01)

(52) U.S. Cl.
USPC ............................. 29/525.01; 29/452; 29/450

(58) Field of Classification Search
USPC ............... 29/525.01, 452, 450, 281.1, 281.4; 60/322
See application file for complete search history.

(56) References Cited

U.S. PATENT DOCUMENTS

| | | | | |
|---|---|---|---|---|
| 96,945 | A | * | 11/1869 | Morse .......................... 237/12.6 |
| 3,653,115 | A | * | 4/1972 | Perkins ............................ 29/282 |
| 3,670,844 | A | * | 6/1972 | Penfold, Jr. ..................... 60/324 |
| 4,584,754 | A | * | 4/1986 | Bagoly ............................ 29/268 |
| 4,706,358 | A | * | 11/1987 | Johnson et al. .................. 29/235 |
| 6,164,067 | A | * | 12/2000 | Cronje ............................. 60/322 |
| 6,167,604 | B1 | * | 1/2001 | Del Bono ..................... 29/281.4 |
| 6,775,890 | B2 | * | 8/2004 | Kolarik ........................... 29/235 |
| 6,857,666 | B1 | * | 2/2005 | Ashlock .......................... 60/322 |
| 6,931,843 | B2 | * | 8/2005 | Gilli ................................ 60/323 |
| 7,273,413 | B2 | | 9/2007 | Frink |
| 7,665,771 | B2 | * | 2/2010 | Roos ............................... 60/322 |

* cited by examiner

*Primary Examiner* — David E Bochna
(74) *Attorney, Agent, or Firm* — James Dottavio; MacMillian, Sobanski & Todd, LLC

(57) ABSTRACT

A tether for connecting tubes includes two mutually spaced pads, each pad located on an opposite side of a lateral axis and releasably connectable to one of the tubes, an elastic stretchable connector that provides structural continuity between the pads, and handles, each handle located at an opposite axial end of the tether, suited to be gripped manually for the application of tensile force to the tether.

15 Claims, 2 Drawing Sheets

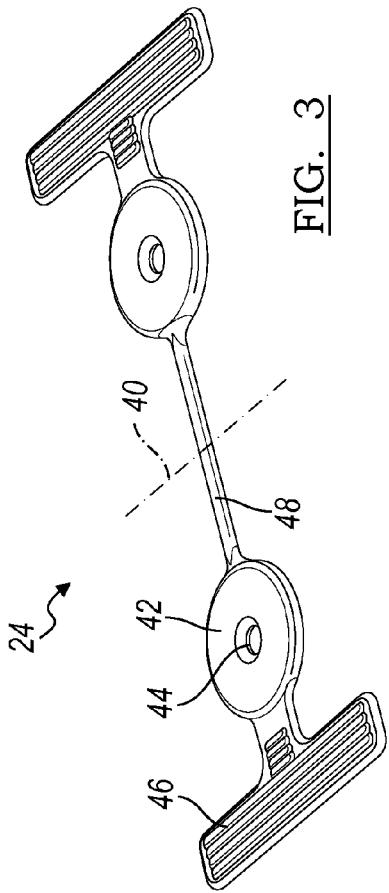
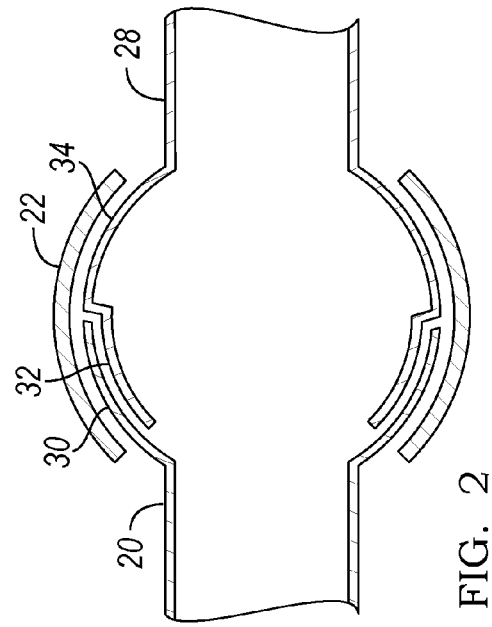
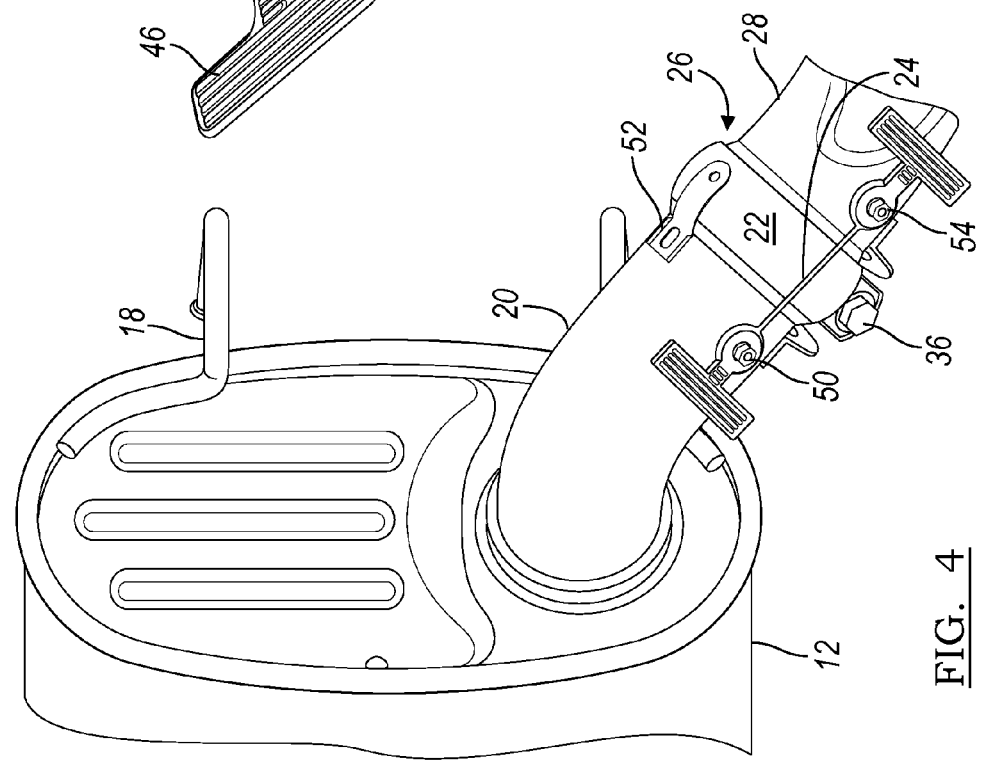

TETHER FOR TUBES OF AN EXHAUST SYSTEM JOINT

BACKGROUND OF THE INVENTION

1. Field of the Invention

This invention relates generally to a joint of an exhaust system, and more particularly to an elastic tether that holds the tubular components of the joint together until a clamp is secured.

2. Description of the Prior Art

A ball-and-flare joint is used to connect tubes of an engine exhaust system of a motor vehicle. After the tubes are fitted together, the joint is secured by tightening the bolt of a band clamp that surrounds the joint and provides a hoop compression force to the joint.

While connecting the tubes, the joint can easily separate due to weight of the assembly, its angular orientation in the vehicle, or incomplete assembly of the joint before securing the tubes together. If the joint is tightened while the tubes are separated, the joint will leak engine exhaust gas and produce excessive noise. Before the joint is secured by tightening a clamp, the tubes of the joint are susceptible to becoming disengaged due to twisting forces produced at joints elsewhere in the exhaust system. The separated joint, however, may appear to be engaged, when, in fact, it is not. Detection of a separated joint is difficult.

A need exists in the industry for a tether that facilitates reliable assembly of engine exhaust system tubes in a motor vehicle, such that the tether holds the tubes together while an operator completes assembly and connection of the tubes.

SUMMARY OF THE INVENTION

A tether for connecting tubes includes two mutually spaced pads, each pad located on an opposite side of a lateral axis and releasably connectable to one of the tubes, an elastic stretchable connector that provides structural continuity between the pads, and handles, each handle located at an opposite axial end of the tether, suited to be gripped manually for the application of tensile force to the tether.

A method for connecting first and second tubes of an engine exhaust system includes connecting a tether to the first tube, installing a clamp over said tube, overlapping end portions of the tubes, connecting the tether to the second tube, securing the tubes together by tightening the clamp; and applying tension to the tether while disconnecting the tether from one of the tubes.

The plastic tether can be removed manually with no tools after the joint is secured. The ability of the tether to stretch readily along its length reduces the importance of precise location of the studs on both sides of the joint, and allows the tether to span the joint while providing sufficient tension to hold the joint components together until the joint is fully completed.

Use of the tether to assemble the joint reduces labor and time required to pull the joint components together during assembly of the joint and before the joint is completed by tightening the clamp.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 2 is a schematic side view showing the ball and flare joint;

FIG. 3 is an isometric view of the tether; and

FIG. 4 is an isometric end view of the muffler showing an assembled ball-and-flare joint, clamp and tether.

DESCRIPTION OF THE PREFERRED EMBODIMENT

Figure 1:
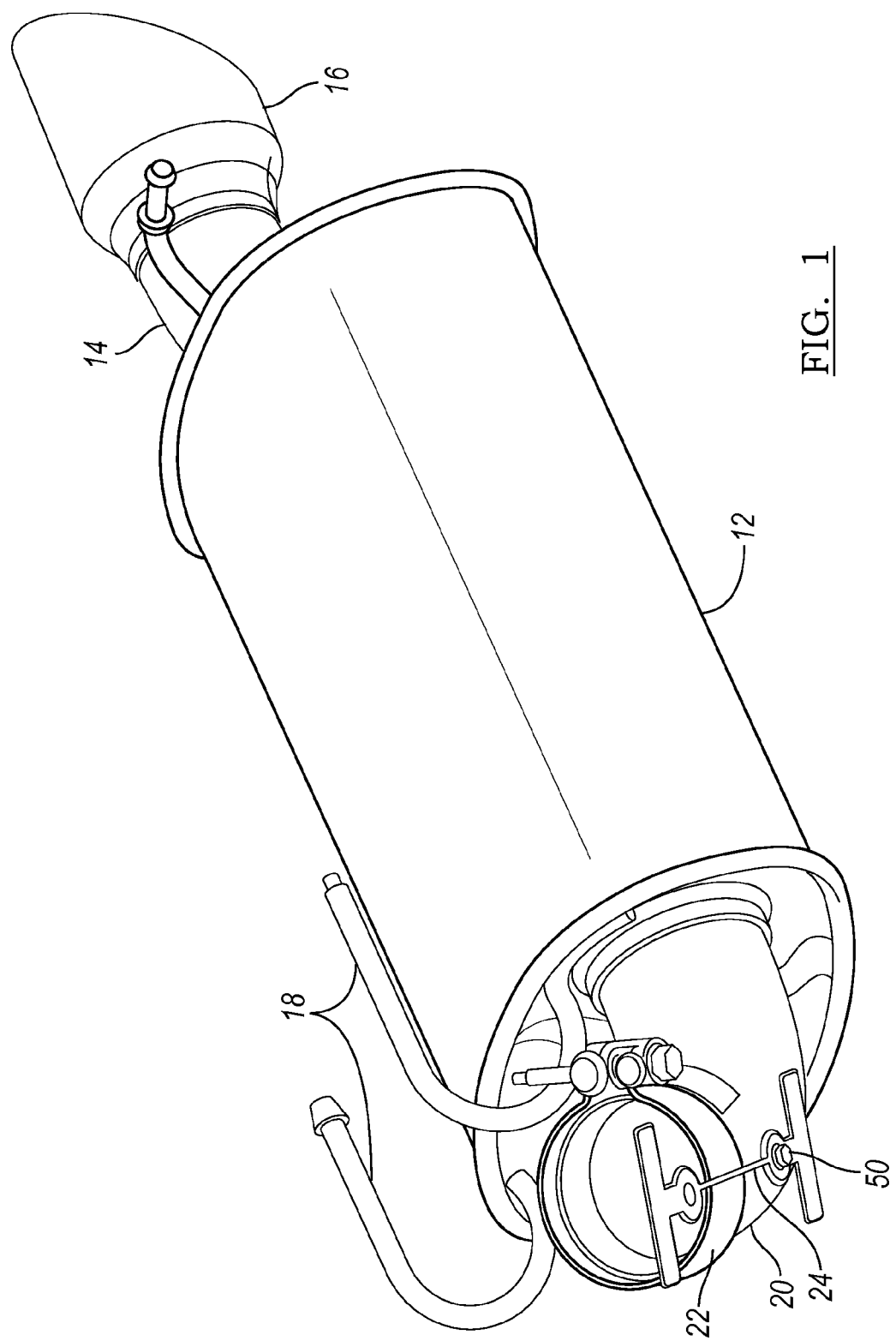
FIG. 1 is an isometric view of an engine exhaust system in the vicinity of a muffler.

The portion of a engine exhaust gas system for a motor vehicle shown in FIG. 1 includes a muffler 12; an outlet tube 14, welded to the exit side of the muffler; a exhaust tip 16, welded to tube 14; hanger rods 18, secured to the inlet end of the muffler; an inlet tube 20, welded to the inlet side of the muffler; a cylindrical clamp 22 having a partial spherical inner contour; and an elastic, stretchable tether 24, releasably secured to the inlet tube 20 and extending over the clamp 22.

The inlet tube 20 is connected by a ball-and-flare joint 26 to a tube 28, located upstream of the inlet tube. FIG. 2 shows that the end of inlet tube 20 is formed with a flare 30 having partial spherical contour. Tube 28 is formed with a portion 32 having a partial spherical contour that is received within the flare 30, and a portion 34 having a partial spherical contour, which is located adjacent flare 30 when the joint 26 is assembled. Clamp 22 surrounds the ends of tubes 20, 28 and secures them together when a threaded fastener 36, such as a bolt 36 or screw on the clamp is tightened.

As FIG. 3 shows tether 24 is substantially symmetric about a lateral axis 40. Located at each side of axis 40 is a circular pad 42 formed with a centered hole 44; a handle 46 connected to the pads and suited to be gripped manually by the operator who assembles joint 26; and an elastically stretchable connector 48, preferably in the form of a thin strip or rod that provides structural continuity between the pads 42. Tether 24 is of plastic, preferably Elastollan S95A55N, which is available commercially from BASF. Preferably connector 48 may be a thin rod having a diameter of about 2.5 mm; the distance between holes 42 is about 82.0 mm; the length of the tether 24 is about 144.5 mm; the thickness of the tether is about 3.5 mm; and the width of the handles 46 is about 62.8 mm.

The procedure for connecting tubes 20 and 28 and producing joint 26 is described with reference to FIGS. 1 and 4. Tether 24 is secured to inlet tube 20 by forcing one of the holes 44 over a stud 50 that extends outward from the surface of tube 20. Clamp 22, which is welded at tab 52 to inlet tube 20, is fitted loosely over the flare 30 of tube 20. Then pipes 20, 28 are engaged by fitting the end portion 32 of tube 28 is fitted into the flare 30 of inlet tube 20. Tether 24 is secured to tube 28 preferably by gripping the handle at the end opposite tube 20, stretching the tether longitudinally by applying tension to the tether and forcing the other hole 44 nearest tube 28 over a stud 54 that extends outward from the surface of tube 28. The end portion 32 of tube 28 is fitted into the flare 30 of inlet tube 20. Clamp 22 is secured around joint 26 by tightening bolt 36. The tether 24 is disconnected from one of the tube 20, 28 while applying tension to the corresponding handle 46 and disconnecting the pad 44 from its engagement with the corresponding tube stud 50, 54. Then the tether 24 is disconnected from the other one of the tube 20, 28 by disconnecting the corresponding pad from its engagement with the corresponding tube stud 50, 54.

In accordance with the provisions of the patent statutes, the preferred embodiment has been described. However, it should be noted that the alternate embodiments can be practiced otherwise than as specifically illustrated and described.

The invention claimed is:

1. A method for connecting first and second tubes of an engine exhaust system, comprising:
   (a) connecting a tether to the first tube;
   (b) installing a clamp over said tube;
   (c) overlapping end portions of the tubes;
   (d) connecting the tether to the second tube;
   (e) securing the tubes together by tightening the clamp;
   (f) disconnecting the tether from the tubes.

2. The method of claim 1, wherein step (a) further comprises connecting the tether to the first tube by forcing a hole in the tether over a projection that extends from a surface of the first tube.

3. The method of claim 1, wherein step (b) further comprises:
   forming a flair in the end portion of one of the tubes; and
   loosely fitting the clamp over the flair.

4. The method of claim 1, wherein step (c) further comprise:
   stretching the tether longitudinally by applying tension to the tether; and
   placing another hole in the tether over a projection that extends outward from a surface of the second tube.

5. The method of claim 4, wherein stretching the tether longitudinally further comprises gripping a handle of the tether at an end of the tether opposite the first tube and applying tensile force to the handle.

6. The method of claim 1, wherein step (c) further comprise:
   using the tether to produce an elastic force tending to hold the tubes together while performing steps (d) and (e).

7. The method of claim 1, wherein step (e) further comprises securing the tubes together by tightening a fastener that engages the clamp.

8. The method of claim 1, wherein step (f) further comprises
   while applying tension to the tether, disconnecting the tether from one of the tubes; and
   disconnecting the tether from another one of the tubes.

9. A method for connecting first and second tubes of an engine exhaust system, comprising:
   (a) connecting a tether to the first tube;
   (b) overlapping end portions of the tubes;
   (c) connecting the tether to the second tube;
   (d) securing the tubes together;
   (e) disconnecting the tether from the tubes.

10. The method of claim 9, wherein step (a) further comprises connecting the tether to the first tube by forcing a hole in the tether over a projection that extends outward from a surface of the first tube.

11. The method of claim 9, wherein step (b) further comprise:
    stretching the tether longitudinally by applying tension to the tether; and
    placing another hole in the tether over a projection that extends from a surface of the second tube.

12. The method of claim 11, wherein stretching the tether longitudinally further comprises gripping a handle of the tether at an end of the tether opposite the first tube and applying tensile force to the handle.

13. The method of claim 9, wherein step (b) further comprise:
    using the tether to produce an elastic force tending to hold the tubes together while performing steps (c) and (d).

14. The method of claim 9, wherein step (d) further comprises securing the tubes together by tightening a fastener that engages a clamp.

15. The method of claim 9, wherein step (e) further comprises
    while applying tension to the tether, disconnecting the tether from one of the tubes; and
    disconnecting the tether from another one of the tubes.

* * * * *